(12) United States Patent
Feichtinger et al.

(10) Patent No.: US 6,669,284 B2
(45) Date of Patent: Dec. 30, 2003

(54) DEVICE FOR GUIDING A SEAT OF A VEHICLE

(75) Inventors: Achim Feichtinger, Böblingen (DE); Josef Klink, Nagold (DE); Hans-Jürgen Schlaffke, Saulgau (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/981,302

(22) Filed: Oct. 18, 2001

(65) Prior Publication Data

US 2002/0053820 A1 May 9, 2002

(30) Foreign Application Priority Data

Oct. 18, 2000 (DE) .......................... 100 51 669

(51) Int. Cl.⁷ .............................. B60N 2/42; A47C 1/02; F16M 13/00
(52) U.S. Cl. .............................. 297/216.18; 297/216.1; 297/344.1; 248/429
(58) Field of Search ................. 297/216.18, 216.1, 297/344.1; 248/429; 188/371

(56) References Cited

U.S. PATENT DOCUMENTS

| | | | | |
|---|---|---|---|---|
| 3,669,397 A | * | 6/1972 | Le Mire | 248/371 |
| 3,730,586 A | * | 5/1973 | Eggert, Jr. | 297/216.18 |
| 4,232,895 A | | 11/1980 | Yoshio et al. | |
| 5,829,728 A | * | 11/1998 | Hoshihara et al. | 248/429 |
| 5,882,074 A | * | 3/1999 | Kojima | 297/341 |
| 5,918,847 A | * | 7/1999 | Couasnon | 248/430 |
| 6,352,312 B1 | * | 3/2002 | Rees | 297/470 |
| 6,354,553 B1 | * | 3/2002 | Lagerweij et al. | 248/430 |
| 2002/0033625 A1 | * | 3/2002 | Goy et al. | 297/344.18 |

FOREIGN PATENT DOCUMENTS

| | | |
|---|---|---|
| DE | 3906659 C2 | 10/1993 |
| DE | 19613506 C2 | 2/1998 |
| DE | 19942973 A1 | 3/2001 |
| JP | 7-61274 | 3/1995 |
| JP | 10-297425 | 11/1998 |

* cited by examiner

*Primary Examiner*—Peter M. Cuomo
*Assistant Examiner*—Sarah C. Burnham
(74) *Attorney, Agent, or Firm*—Crowell & Moring LLP

(57) ABSTRACT

A device for guiding a seat of a vehicle, in particular a motor vehicle, has a running-rail arrangement comprising at least one guide rail arranged on the seat and at least one sliding rail fastened to the vehicle. At least one arresting element is provided. The arresting element arrests the seat of the vehicle in a desired position on the sliding rail and has at least one deformation element which absorbs energy in the event of a crash.

32 Claims, 3 Drawing Sheets

DEVICE FOR GUIDING A SEAT OF A VEHICLE

This application claims the priority of German application 100 51 669.6, filed Oct. 18, 2000, the disclosure of which is expressly incorporated by reference herein.

BACKGROUND AND SUMMARY OF THE INVENTION

The present invention relates to a device for guiding a seat of a vehicle, in particular a motor vehicle, having a running-rail arrangement comprising at least one guide rail arranged on the seat and at least one sliding rail fastened to the vehicle, and having a deformation element which absorbs energy in the event of a crash.

In conventional vehicles, the front seats, in particular, are arranged such that they can be moved, with the result that an optimum seat position can be set as a function of the size of a particular vehicle occupant. For this purpose, the seat is usually arranged in a manner such that it can be moved in the vehicle by means of a running-rail arrangement. The occupant can therefore bring the seat of the vehicle into a desired position by means of an adjusting lever, for example.

In the event of a collision, forces of inertia, which may be considerable, depending on the severity of the collision, act on the occupant. These forces are transmitted by the occupant, who is pressed into a backrest of the seat of the vehicle, to the known device for guiding the seat. In this case, the running-rail arrangement of the known device, with which arrangement the seat of the vehicle is fastened moveably to the vehicle floor, is, in particular, subjected to a considerable mechanical stress.

In order to reduce at least some of the force or energy acting on the vehicle occupant, in a device known from practice, deformation elements are provided for guiding the seat, with the result that these deformation elements can absorb the energy which occurs, reducing the energy acting on the occupant as a result.

A device of this type for guiding the seat of the vehicle is also disclosed in German patent publication DE 196 13 506 C2. This known device consists of the running-rail arrangement which is designed as a pair of seat rails. The known running-rail arrangement has at least one sliding rail designed as the lower rail and at least one guide rail designed as the upper rail. The lower rail is connected to the vehicle floor. The upper rail is guided in a manner such that it can be displaced longitudinally in the lower rail and is connected to the seat of the vehicle. Rolling elements or sliding elements, for example, which enable the seat of the vehicle to be displaced in a low-friction manner may be provided between the lower rail and the upper rail.

Furthermore, a slide fastened to the lower rail is provided. The seat of the vehicle is arranged in a manner such that it can be moved together with the upper rail in the lower rail in such a way that the seat can be arrested in a desired position on the slide or on the lower rail by means of an arresting element designed as a locking device. For this purpose, the locking device has latching elements arranged on the upper rail and on the slide. The slide is fastened to the lower rail via a predetermined breaking point. In the event of a collision, this predetermined breaking point is then intended to break, so that the slide can be moved together with the seat of the vehicle relative to the lower rail.

In addition, at least one deformation element designed as an energy-absorbing element is provided on the slide. The deformation element has webs, for example, in which a wedge-shaped element arranged on the lower rail can engage in the event of a collision. The webs are deformed, with energy being absorbed, in the event of a collision by the wedge-shaped element until the webs are destroyed.

This known device has the disadvantage that, after a collision, both the sliding rail, which is designed as the lower rail, and the slide have to be replaced. The reason for this is that, firstly, the slide equipped with the deformation element and, secondly, the lower rail having the wedge-shaped element, for example, are deformed considerably or destroyed. Moreover, in the known device, the deformation elements absorb energy merely in one direction. As a result, relief of the load on the vehicle occupant is possible only in the event of a rear-end collision or only in the event of a front-end collision.

Furthermore, the structural outlay in the known device is considerable, since, in addition to the guide rail and the sliding rail and the arresting element formed as a latching element, the running-rail arrangement also has a slide.

German patent publication DE 39 06 659 C2 discloses a seat guide for a vehicle seat, in which a deformation element for reducing energy is arranged on a sliding rail and on a driving device and a rack. However, in this known solution, the energy absorption in the event of a crash is likewise achieved by a complex and costly mechanism.

One object of the invention is to provide a device for guiding a seat of a vehicle which is further improved with regard to vehicle occupant safety and fitting outlay, in particular after a collision.

According to the invention, this object is achieved by a device for guiding a seat of a vehicle including a running-rail arrangement having at least one guide rail arranged on the seat and at least one sliding rail fastened to the vehicle. At least one arresting element arrests the seat in a desired position on the sliding rail and has at least one deformation element which absorbs energy in the event of a crash.

The device according to the invention affords the advantage that only the deformation element is deformed in a collision. Further components of the running-rail arrangement are not deformed or destroyed in the event of a collision. Therefore, after the vehicle has been involved in an accident, only the deformation element of the device according to the invention has to be exchanged.

Furthermore, the energy acting on the occupant and on the device in a rear-end impact and in a frontal impact of the vehicle can be absorbed by the device according to the invention. This is achieved in particular in that the deformation element can be displaced in both directions and hence a reduction in energy can be achieved in every event of a collision.

Furthermore, it is advantageous in the device according to the invention that an arresting element of the running-rail arrangement is coupled to the sliding rail via the deformation element. An additional slide is therefore not required. As a result, the fitting or structural outlay in the device according to the invention is minimized.

An advantageous development of the invention makes provision for the deformation element to be able to be displaced in a recess on the guide rail. Since the recess is of tapered design in the direction of displacement of the deformation element, in the event of a collision, energy can be absorbed since the deformation element is deformed in the tapering recess and the friction between the deformation element and the guide rail is increased during the displacement.

It is conceivable for the recess to be designed, for example, essentially in the shape of an elongated hole or the like. A deformation element, which is formed in the shape of a plate or the like, can then be displaced in the recess by guide elements, in the form of a bolt, for example, in the recess. Of course, other structural designs of the guide elements are also possible.

Furthermore, it is possible for the deformation element to have an energy-absorbing deformation section. It is advantageous if two deformation elements, each having a deformation section, are provided. For example, the deformation elements can then be arranged in such a manner that when the deformation element is moved both in one direction of displacement and in the other direction of displacement, a corresponding deformation of the deformation element is ensured. The deformation element can therefore absorb energy both in a rear-end collision and in a frontal collision of the motor vehicle.

It is particularly advantageous if the deformation element is provided as bent sheet metal, in which case the deformation section is then bent in a wavy manner, for example. Very great energy absorption is therefore made possible. It is also possible for the deformation element, as bent sheet metal, to be configured in the form of a spring.

Alternatively, the deformation section can also be designed as a honeycomb structure or similar structure. It is also conceivable for the deformation element to be manufactured from a metallic material, particularly if the deformation section is of wavy design. If the deformation element is to have a honeycomb structure, it is also possible that, in addition, a material manufactured from plastic can be used as filling for the honeycomb structure.

Of course, the deformation element can also be produced entirely from a material which absorbs energy, such as metal, plastic or similar material.

Irrespective of the particular design of the deformation element, there is also the advantage that the displaceability or the path of displacement of the seat of the vehicle in a collision can be limited by the length of the recess.

Further advantages and advantageous refinements of the invention become clear from the patent claims and from the exemplary embodiments described below in principle with reference to the drawings:

DESCRIPTION OF THE PREFERRED EMBODIMENTS

Figure 1:
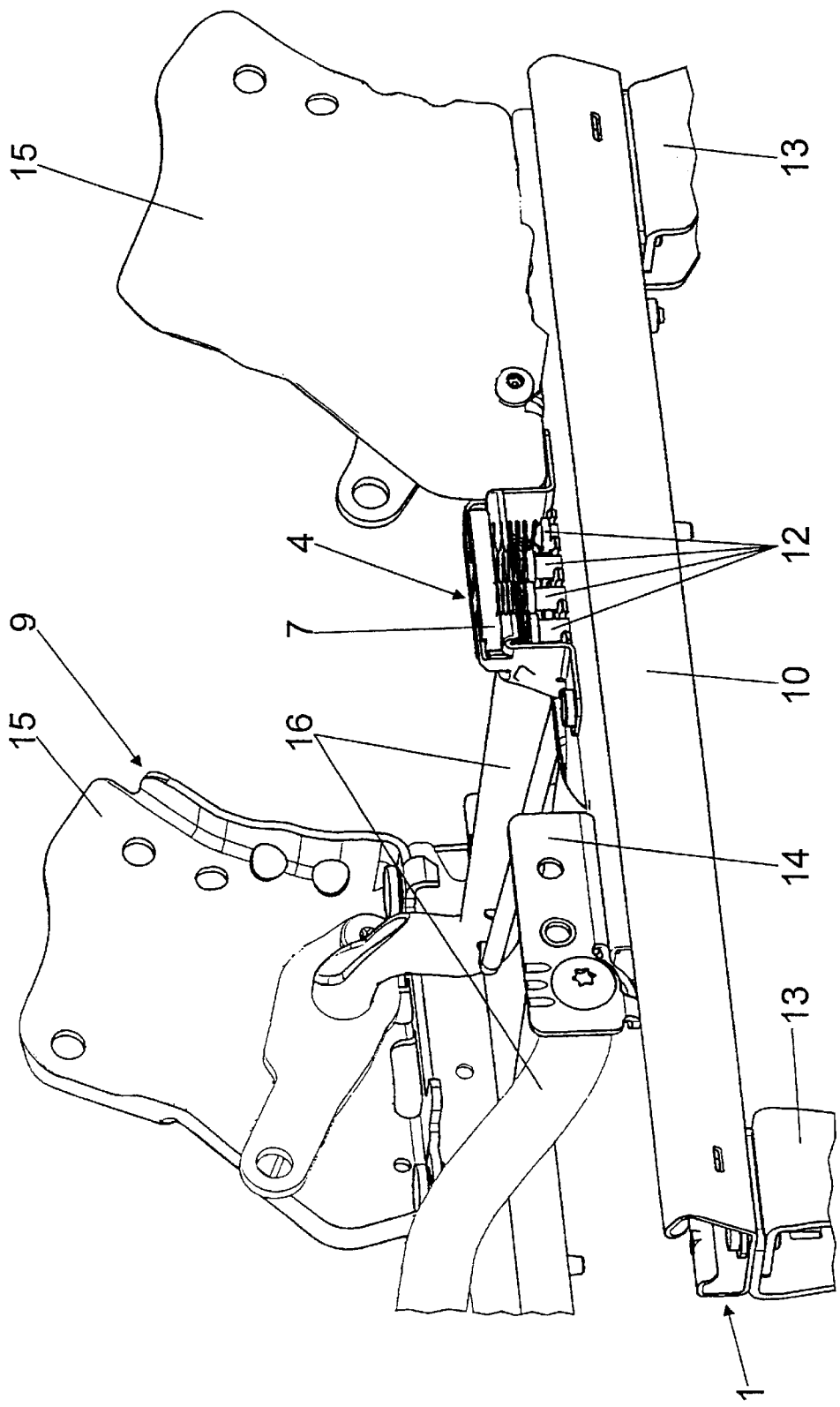
FIG. 1 shows a schematic, three-dimensional partial view of a seat of a motor vehicle having a device according to the invention for guiding the seat.

In FIG. 1, a seat 9 of a vehicle designed as a motor vehicle is partially illustrated. The seat 9 has side parts 15 to which a backrest and a seat cushion can be fastened. The side parts 15 are connected to each other via cross struts 16, the side parts 15 being arranged parallel to each other.

The seat 9 is connected to a device according to the invention for guiding the seat 9 in such a manner that the seat is arranged so that it can be adjusted longitudinally in the vehicle. For this purpose, the device has a running-rail arrangement 1. The running-rail arrangement 1 comprises a guide rail 2, which is illustrated in greater detail in FIG. 2, a sliding rail 10, and an arresting element 4.

The sliding rail 10 is connected fixedly to the vehicle, for example to the vehicle floor. Foot elements 13, which connect the sliding rail 10 to the motor vehicle floor, are customarily provided for this purpose. The foot elements 13 are merely indicated in FIG. 1.

The seat 9 is connected together with its side parts 15 and its cross struts 16 to the arresting element 4 via at least one connecting part 14 designed in the form of a flange. The arresting element 4 is, in turn, connected to the guide rail 2 of the running-rail arrangement 1 via a deformation element 3, which is illustrated in greater detail in FIG. 2.

The seat 9 is arranged in the motor vehicle in a manner such that it can be adjusted longitudinally along the sliding rail by the guide rail 2, in which case an occupant can arrest the seat 9 in a desired position on the sliding rail 10 by means of the arresting element 4.

The arresting element 4 is a spring-loaded clamping member 7 which clamps or locks the seat 9 of the motor vehicle together with the guide rail 2 to the sliding rail 10 in an arresting position. For this purpose, the clamping member 7 has a plurality of latching elements 12, at least one latching element 12 latching, in the arresting position, into a latching plate arranged on the sliding rail 10. An infinitely variable adjustment of the seat 9 is therefore possible. Of course, other arresting elements 4 known per se to one of ordinary skill in the art can be used in the device according to the invention for guiding the seat of the vehicle.

In an advantageous manner, the arresting element 4 is connected here to the guide rail 2 by means of the deformation element 3 in such a manner that the seat 9 can be moved relative to the guide rail 2 in the event of a collision. In this case, the deformation element 3, by appropriate deformation, can absorb the energy acting on the occupant and on the device according to the invention in a collision.

Figure 2:
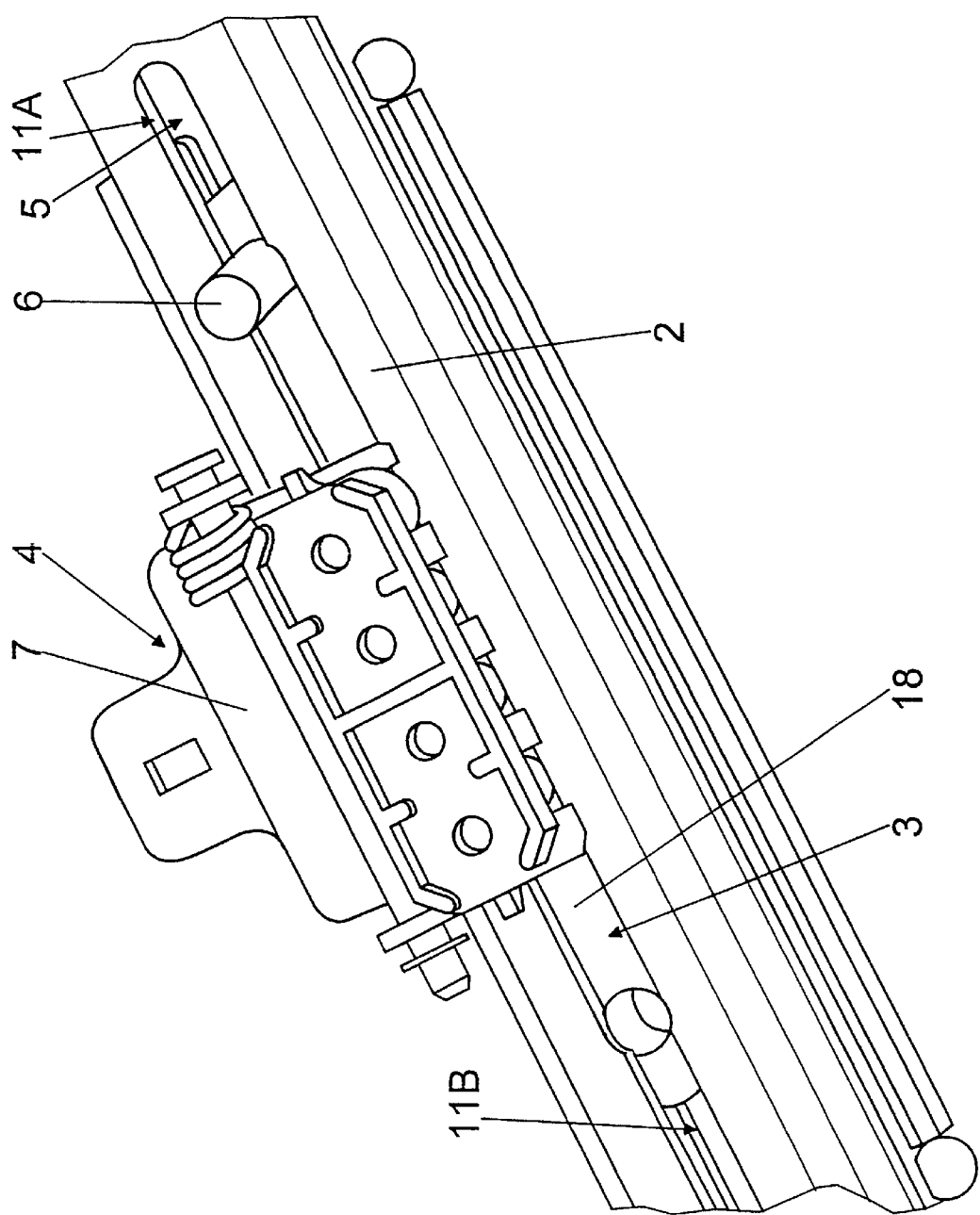
FIG. 2 shows a schematic, three-dimensional partial view of the device according to the invention having a deformation element arranged in a recess.

A first refinement of the deformation element 3 is illustrated in FIG. 2. In this refinement, the deformation element 3 is designed with a plate 18 which is arranged in a manner such that it can be displaced, in particular in the event of a crash, in a recess 5 provided on the guide rail 2.

The deformation element 3 designed with the plate 18 has a guide element 6 which is in the form of a bolt and with which the deformation element 3 is arranged in a manner such that it can be displaced in the recess 5 of the guide rail 2. The recess 5 is, for example, designed essentially in the form of an elongated hole, the end regions 11A, 11B being of tapered design in such a manner that their width is smaller than the diameter of the guide element 6. In this case, provision may also be made for the end regions 11A, 11B to taper increasingly in a V-shaped manner.

In the event of a crash, a reduction in energy by the guide elements 6, which are in the form of bolts, of the deformation element 3, which is actively effective here, being displaced along the tapered end regions 11A, 11B of the recess 5 is made possible by the end regions in the present case being bent upwards by the guide element 6, with a damping effect being deployed, until the guide bolt reaches a final stop in the recess 5. Of course, in a design alternative, it is also possible for the guide element 6 to be provided as a passive deformation element which is deformed along the end regions 11A, 11B of the recess 5, or for both the guide element 6 and the edges of the end regions of the recess 5 to undergo a deformation. In the latter case, a combination of active and passive deformation elements would be provided.

Figure 3:
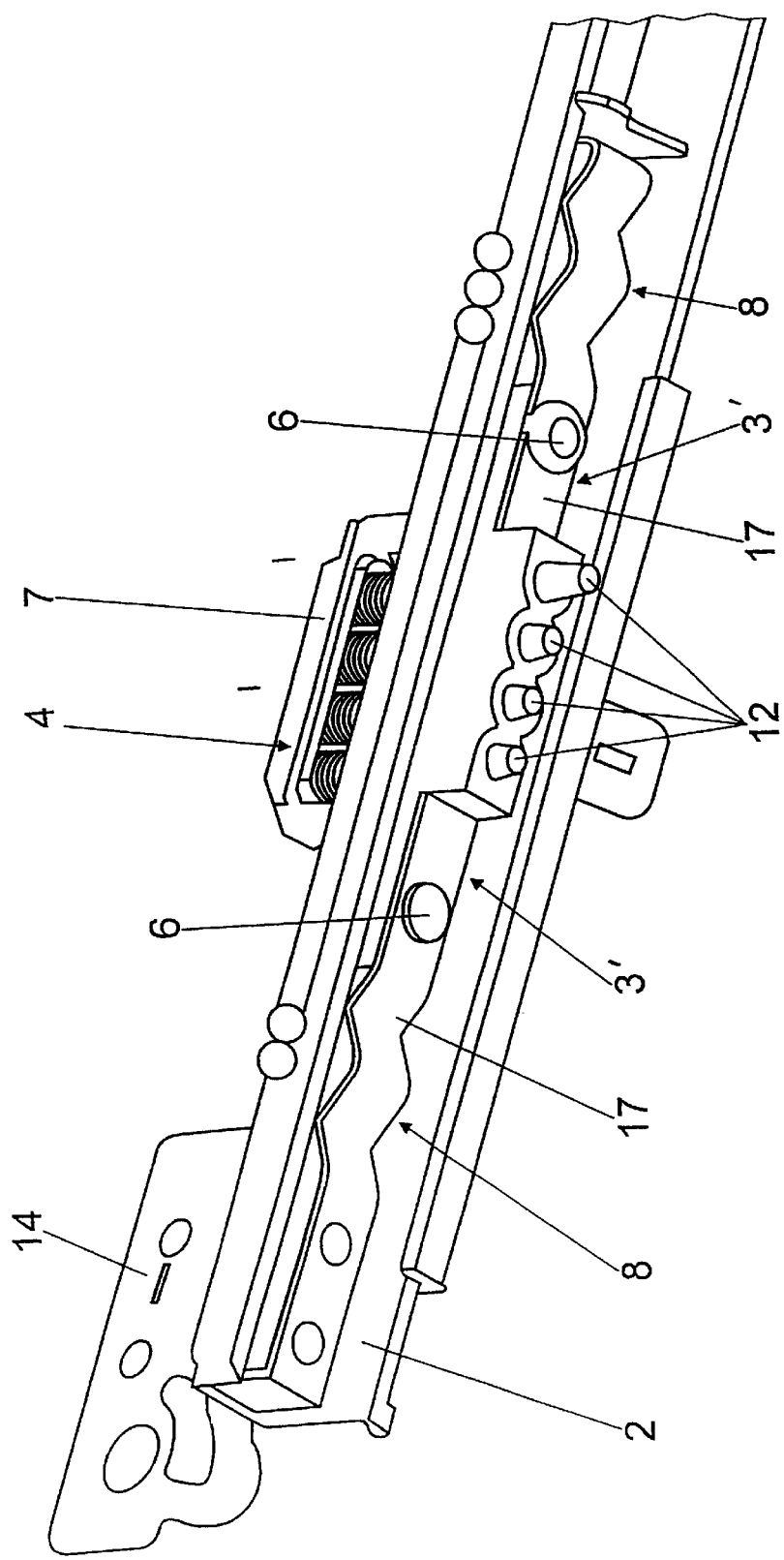
FIG. 3 shows a schematic, three-dimensional partial view according to FIG. 2 having a deformation element of wavy design.

FIG. 3 illustrates the device according to the invention having a deformation element 3' of alternative design. Here too, the device according to the invention is merely shown partially together with the running-rail arrangement 1, the same reference numbers being used for components which are the same as in the previously described design.

In this structural refinement, the arresting element 4 is coupled to the guide rail 2 likewise by means of a deformation element 3' in such a manner that, in the event of a collision, the seat 9 can be displaced along the guide rail 2. For this purpose, a recess 5 may preferably also be provided here on the guide rail 2, with the result that the path of displacement of the deformation element 3' is limited. In a collision, the deformation element 3' can absorb energy by the deformation element 3' being deformed in predetermined sections.

In this refinement, the deformation element 3' is provided, for example, with two sheet-metal strips 17, one end of which is connected to the clamping member 7 and the other to the guide rail 2. The sheet-metal strips 17 each have a deformation section 8, for example.

In the design according to FIG. 3, the deformation sections 8 are of essentially wavy design. In the event of a collision, the deformation sections 8, which are of wavy design, of the sheet-metal strips 17 can be correspondingly deformed, so that in the event of a movement of the seat 9 relative to the guide rail 2, for example in the case of a collision of the motor vehicle, as much energy as possible is absorbed, and the load on the occupant is therefore minimized.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A device for guiding a seat of a vehicle having a running-rail arrangement comprising:
    at least one guide rail arranged on the seat,
    at least one sliding rail fastened to the vehicle, and
    at least one arresting element which locks the seat together with the guide rail to the sliding rail so as to arrest the seat in a desired position on the sliding rail and has at least one deformation element causing absorption of energy in the event of a crash,
    wherein the deformation element couples the arresting element to the guide rail in such a manner that the seat can be moved along the guide rail in the event of a collision.

2. The device according to claim 1, wherein the deformation element can be displaced in the event of a collision in a recess provided in the guide rail.

3. The device according to claim 2, wherein at least end regions of the recess are, in some parts, of tapered design so that, in the event of a collision, energy can be absorbed in a direction of displacement of the deformation element.

4. The device according to claim 2, wherein the deformation element has at least one guide element in the form of a bolt and is designed with a plate which is arranged so that it can be displaced by the bolt in the recess provided in the guide rail.

5. The device according to claim 1, wherein the deformation element is designed with at least one sheet-metal strip which has at least one deformation section.

6. The device according to claim 5, wherein the deformation section is of essentially wavy design.

7. The device according to claim 5, wherein the deformation section has a honeycomb structure.

8. The device according to claim 2, wherein, in the event of a collision, a path of displacement of the deformation element along the guide rail is limited by the recess.

9. The device according to claim 1, wherein the arresting element has a spring-loaded clamping member which, in its arresting position, locks the seat together with the guide rail to the sliding rail.

10. The device according to claim 1, wherein the vehicle is a motor vehicle.

11. The device according to claim 3, wherein the deformation element has at least one guide element in the form of a bolt and is designed with a plate which is arranged so that it can be displaced by the bolt in the recess provided in the guide rail.

12. The device according to claim 2, wherein the deformation element is designed with at least one sheet-metal strip which has at least one deformation section.

13. The device according to claim 12, wherein the deformation section is of essentially wavy design.

14. The device according to claim 12, wherein the deformation section has a honeycomb structure.

15. The device according to claim 3, wherein the deformation element is designed with at least one sheet-metal strip which has at least one deformation section.

16. The device according to claim 15, wherein the deformation section is of essentially wavy design.

17. The device according to claim 15, wherein the deformation section has a honeycomb structure.

18. The device according to claim 4, wherein the deformation element is designed with at least one sheet-metal strip which has at least one deformation section.

19. The device according to claim 18, wherein the deformation section is of essentially wavy design.

20. The device according to claim 18, wherein the deformation section has a honeycomb structure.

21. The device according to claim 3, wherein, in the event of a collision, a path of displacement of the deformation element along the guide rail is limited by the recess.

22. The device according to claim 4, wherein, in the event of a collision, a path of displacement of the deformation element along the guide rail is limited by the recess.

23. The device according to claim 5, wherein, in the event of a collision, a path of displacement of the deformation element along the guide rail is limited by the recess.

24. The device according to claim 6, wherein, in the event of a collision, a path of displacement of the deformation element along the guide rail is limited by the recess.

25. The device according to claim 7, wherein, in the event of a collision, a path of displacement of the deformation element along the guide rail is limited by the recess.

26. The device according to claim 2, wherein the arresting element has a spring-loaded clamping member which, in its arresting position, locks the seat together with the guide rail to the sliding rail.

27. The device according to claim 3, wherein the arresting element has a spring-loaded clamping member which, in its arresting position, locks the seat together with the guide rail to the sliding rail.

28. The device according to claim 4, wherein the arresting element has a spring-loaded clamping member which, in its arresting position, locks the seat together with the guide rail to the sliding rail.

29. The device according to claim 5, wherein the arresting element has a spring-loaded clamping member which, in its arresting position, locks the seat together with the guide rail to the sliding rail.

30. The device according to claim 6, wherein the arresting element has a spring-loaded clamping member which, in its arresting position, locks the seat together with the guide rail to the sliding rail.

31. The device according to claim 27, wherein the arresting element has a spring-loaded clamping member which, in its arresting position, locks the seat together with the guide rail to the sliding rail.

32. The device according to claim 8, wherein the arresting element has a spring-loaded clamping member which, in its arresting position, locks the seat together with the guide rail to the sliding rail.

* * * * *